March 24, 1970     G. SCHAEFFLER ET AL     3,502,377
ROLLER BEARING
Filed April 3, 1968
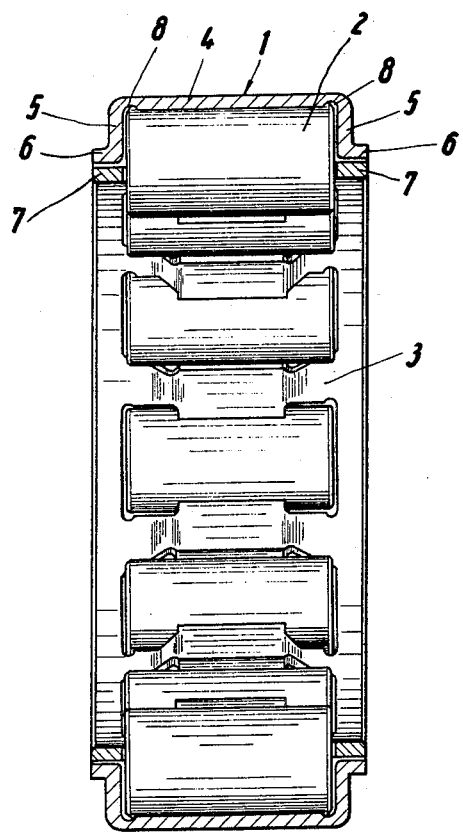
Inventors
GEORG SCHAEFFLER
LEO LINZ
BY
ATTORNEYS

United States Patent Office 3,502,377
Patented Mar. 24, 1970

3,502,377
ROLLER BEARING
Georg Schaeffler and Leo Linz, Herzogenaurach, Germany, assignors to Industriewerk Schaeffler OHG, Herzogenaurach, Germany, a corporation of Germany
Filed Apr. 3, 1968, Ser. No. 718,578
Claims priority, application Germany, Apr. 15, 1967, J 16,378
Int. Cl. F16c 33/58
U.S. Cl. 308—212         3 Claims

ABSTRACT OF THE DISCLOSURE

A roller bearing comprised of a thin-walled outer race formed without cutting and provide with abutment flanges at each end and a plurality of cylindrical rollers travelling thereon.

PRIOR ART

Various types of roller bearings of this nature are known and are widely used for needle bearings in which the rollers may be disposed in a cage or may be closely adjacent to one another. In either case, the ends of the rollers are spaced a specific distance from the point where the side flange meets the roller raceway of the outer race for construction reasons. This arrangement is particularly necessary for outer races formed without cutting since it is not possible to form a flange sufficiently accurate at this angular point that the roller ends could safely roll thereon. On the contrary, it is at this point where there is always a specific arc present due to technical manufacturing problems which arc makes it impossible for the roller ends to abut against this angular point since it would result in increase stresses on the roller ends and on the corresponding contact points of the race.

Attempts have been made to provide roller bearings with cylindrical rollers whose ends are forced as far as possible from this area of the race. To avoid these difficulties, attempts have been made to provide a radius on the ends of the rollers in the transitional area of the rollers where the cylindrical surface meets the end surfaces, which radius was slightly larger than the radius at the transitional area of the race. However, these radii differ in races formed without cutting by insignificant degrees and therefore, this type of construction did not result in any satisfactory solution.

OBJECTS OF THE INVENTION

It is an object of the invention to provide a novel roller bearing in which excessive stresses upon the ends of cylindrical rollers and the resulting problems are avoided.

This and other objects and advantages of the invention will become obvious from the following detailed description.

THE INVENTION

The novel bearing of the invention is comprised of a thin-walled outer race formed without cutting by drawing from sheet metal and provided with abutment flanges on either end thereof and a plurality of cylindrical rollers travelling thereon, the raceway of the outer race being provided with an enlarged diameter formed without cutting in the area of roller ends.

The use of such diameter enlargements in the bearing of the invention positively prevents the roller ends from coming into contact with any part of the raceway and therefore harmful pressures on the edges of these points are avoided. The radius resulting from the transition of the cylindrical part of the outer race into the abutment flange is radially spaced from the roller ends in this embodiment so that the said ends cannot come into contact with this point.

Referring now to the drawing:

The figure is a longitudinal cross-section of one bearing embodiment of the invention.

The illustrated bearing of the invention is comprised of an outer race 1, cylindrical rollers 2 travelling thereon and cage 3, which accommodates rollers 2 and keeps them from dropping off inwardly. The outer race 1 consists of cylindrical portion 4 and radially inwardly directed abutment flanges 5 which are provided at their bores with axially outwardly directed collars 6. Cage 3 is concentrically guided on collars 6 by its end rings 7. The outer race 1 is provided in the vicinity of the ends of rollers 2 with an enlarged diameter 8 produced without cutting which prevent the roller ends from coming in contact with the outer raceway.

It is not necessary for the bearing to have a cage for accommodating the rollers for the rollers for the bearing may have a plurality of rollers arranged closely adjacent to one another without a cage. Moreover, the abutment flanges may have any desired profile and the axially directed collars can be particularly omitted when a cage is not used.

Various other modifications may be made in the bearings of the invention without departing from the spirit or scope thereof.

We claim:
1. A roller bearing comprising a thin-walled outer race drawn from sheet metal and provided with abutment flanges on either end thereof and a plurality of cylindrical rollers having flat ends travelling thereon, whereby the flat ends of the rollers abut the flanges, the raceway of the outer race being provided with reduced wall thicknesses formed without cutting in the areas of the roller flat ends so that the diameter of the raceway is enlarged in these areas.
2. A bearing of claim 1 wherein the cylindrical rollers are accommodated in a cage.
3. A bearing of claim 2 wherein the abutment flanges are provided axially outwardly directed collars for concentrically guiding the cage on its end rings.

References Cited

UNITED STATES PATENTS

| | | | |
|---|---|---|---|
| 189,427 | 4/1877 | Chaplin | 308—212 |
| 2,038,474 | 4/1936 | Brown. | |
| 2,383,727 | 8/1945 | Lewis. | |
| 2,741,015 | 4/1956 | Young. | |
| 2,884,288 | 4/1959 | Herrmann et al. | 308—213 |
| 3,307,891 | 3/1967 | Carullo | 308—213 |

MARTIN P. SCHWADRON, Primary Examiner
F. SUSKO, Assistant Examiner